(12) United States Patent
Tsai et al.

(10) Patent No.: US 6,450,475 B1
(45) Date of Patent: Sep. 17, 2002

(54) PLATFORM ADJUSTMENT DEVICE FOR SCANNER

(75) Inventors: Jenn-Tsair Tsai; I-Chang Lu, both of Hsinchu; Jone-Nun Chen, Taichung, all of (TW)

(73) Assignee: Mustek Systems Inc., Hsinchu (TW)

( * ) Notice: Subject to any disclaimer, the term of this patent is extended or adjusted under 35 U.S.C. 154(b) by 0 days.

(21) Appl. No.: 09/750,155

(22) Filed: Dec. 29, 2000

(51) Int. Cl.[7] ............................. F16M 11/00; H04N 1/04
(52) U.S. Cl. ........................................ 248/650; 358/474
(58) Field of Search ............................. 248/694, 346.03, 248/650, 274.1, 316.2; 358/471, 474, 400; 359/823; 74/89.35

(56) References Cited

U.S. PATENT DOCUMENTS

| | | | | |
|---|---|---|---|---|
| 2,940,784 A | * | 6/1960 | Fell ............................. | 74/89.35 |
| 3,402,613 A | * | 9/1968 | Neusel et al. ............... | 74/89.35 |
| 3,605,508 A | * | 9/1971 | Fell ............................. | 74/89.23 |
| 3,669,393 A | * | 6/1972 | Paine et al. ............... | 248/188.4 |
| 3,700,313 A | * | 10/1972 | Karr et al. .................. | 359/873 |
| 4,659,052 A | * | 4/1987 | Nagata ....................... | 248/575 |
| 4,918,956 A | * | 4/1990 | Schoch ........................ | 72/21.1 |
| 5,427,349 A | * | 6/1995 | Obrecht ....................... | 248/657 |
| 5,838,540 A | * | 11/1998 | Wen-Shyong ............... | 361/686 |
| 6,012,697 A | * | 1/2000 | Ohtomo et al. ............. | 248/476 |
| 6,024,330 A | * | 2/2000 | Mroz et al. ............... | 248/188.4 |
| 6,053,590 A | * | 4/2000 | Chang ......................... | 312/284 |
| 6,075,242 A | * | 6/2000 | Tsai et al. ................... | 250/234 |
| 6,169,622 B1 | * | 1/2001 | Tsai et al. ................... | 359/210 |

FOREIGN PATENT DOCUMENTS

JP          05297651 A     * 11/1993

* cited by examiner

Primary Examiner—Anita King
(74) Attorney, Agent, or Firm—Birch, Stewart, Kolasch & Birch, LLP

(57) ABSTRACT

A device for adjusting the position of platform of a scanner and calibrating the depth of field of an opto-mechanic module of the scanner. The device includes an exposed driving element for moving a supporting element of the platform. A first embodiment includes a nut incorporated with an exposed flange for turning, and a stud fixed on a lower base. A second embodiment includes a driving slant element movably mounted on the lower case and activated by a screw exposed outwards; and a driven portion formed on an upper case that support the platform. The devices are simple in structure and easy to be used.

6 Claims, 6 Drawing Sheets

PLATFORM ADJUSTMENT DEVICE FOR SCANNER

BACKGROUND OF THE INVENTION

1. Field of Invention

The present invention generally relates to a device for adjusting the position of a platform of a scanner, and more particularly relates to an adjusting device for a flatbed scanner. The device can precisely adjust the height of the platform so as to calibrate the depth of field of the scanner.

2. Related Art

Flatbed scanners have been the mainstream of scanners as peripheral devices of computers. Manufacturing processes for flatbed scanners are of known arts.

As shown in FIG. 1, a flatbed scanner mainly includes a lower case 76 having an opto-mechanic module 75 mounted therein; an upper case 70 mounted on the lower case 76; and a platform 77 mounted on the upper case 70 for carrying the materials (such as documents or photos, not shown) to be scanned. The platform 77 is usually a transparent glass plate supported by a frame of the upper case 70. The platform 77 enables the scanned material to be scanned by the opto-mechanic module 75. In order to ensure good imaging, i.e., a suitable depth of field, the distance between the surface of platform 77 and the opto-mechanic module 75 must be well calibrated. An earlier method for calibrating the optical distance of the surface of platform 77 to the opto-mechanic module 75 is to test scanning and find out the correct position before fixing the platform 77 to the case. The process is rather bothersome.

An adjusting device is further shown in FIG. 1, which is disclosed by Taiwan Laid-open Patent No. 361,756. The platform adjusting device includes a screw hole 71 formed on the upper case 70 who has a platform 77; and a hollow screw 73 engaged with the screw hole 71. The hollow screw 73 has a lower end which stands on a support plate 72 that is fixed to the lower case 76 of the scanner. Finally, a fastening screw 74 passing through the hollow screw 73 will fasten the upper case 70 and the platform 77 to the support plate 72, and fix these elements. When the fastening screw 74 was removed, the height of the platform 77 to the support plate 72 could be adjusted by turning the hollow screw 73.

In the aforesaid adjusting device, the fastening screw 74 passing through the center hole of the hollow screw 73 to fasten the elements will prevent access to the top 78 of the hollow screw 73 where a fastening tool will be applied. So, it is inconvenient that the fastening screw 74 has to be removed from the device before adjusting the hollow screw 73. Therefore, it will be quite bothersome for re-adjusting the height of the platform that the fastening screw 74 has to be removed since there are usually four adjusting devices at the four corners of the platform. Also, the screws are easy to lose. Furthermore, the adjusting devices are based on the support plates that are weak in structure and cause insufficient support to the platform.

SUMMARY OF THE INVENTION

It is therefore an object of the present invention to provide an adjusting device for platform of scanner that can be easily used.

Another object of the present invention is to provide an adjusting device for platform of scanner that is simple in structure and easy to be used.

To achieve the aforesaid object, an adjusting device for platform of scanner according to the present invention mainly includes an exposed driving element for moving a supporting element of the platform. By first releasing a fastening screw, then turning with fingers the driving element from an exposed portion outside of the case, the position of the platform can be adjusted.

In a first embodiment of the present invention, an adjusting device for platform of scanner includes a nut incorporated with an exposed flange for turning, and a stud fixed on the lower base. The nut rotatively engaged on the stud to move vertically and adjust the height of the platform that is supported on the nut.

In a second embodiment of the present invention, an adjusting device for platform of scanner includes a driving slant element movably mounted on the lower case and activated by a screw exposed outwards; and a driven portion formed on the upper case that support the platform. By the function of the slant, the upper case and platform will be moved upward or downward to adjust its position according to a horizontal movement of the driving slant element.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow illustration only, and thus are not limitative of the present invention, and wherein.

DETAILED DESCRIPTION OF THE INVENTION

Figure 1:
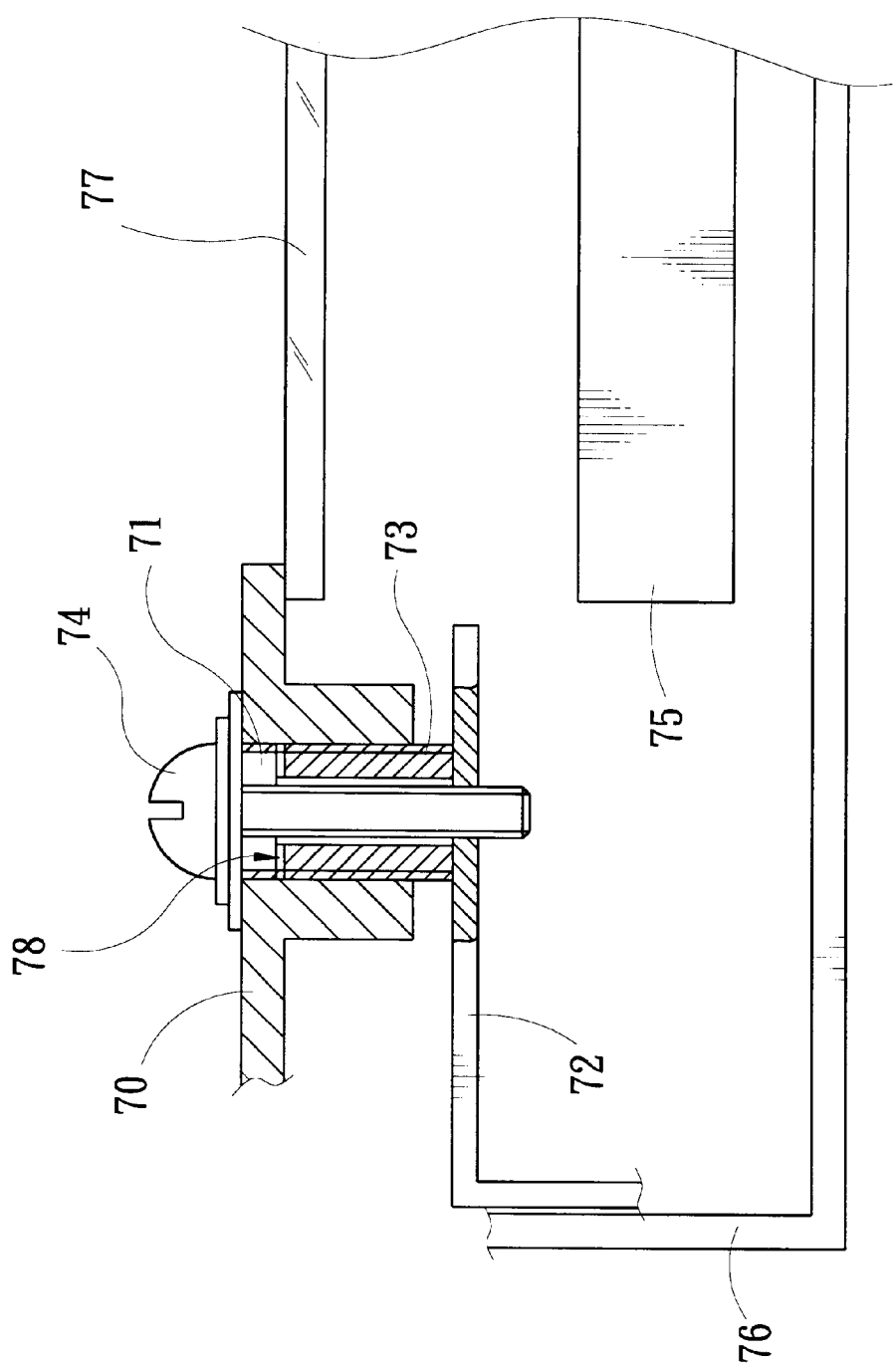
FIG. 1 is a sectional view of a prior art of adjusting device for platform of a scanner.
Figure 2:
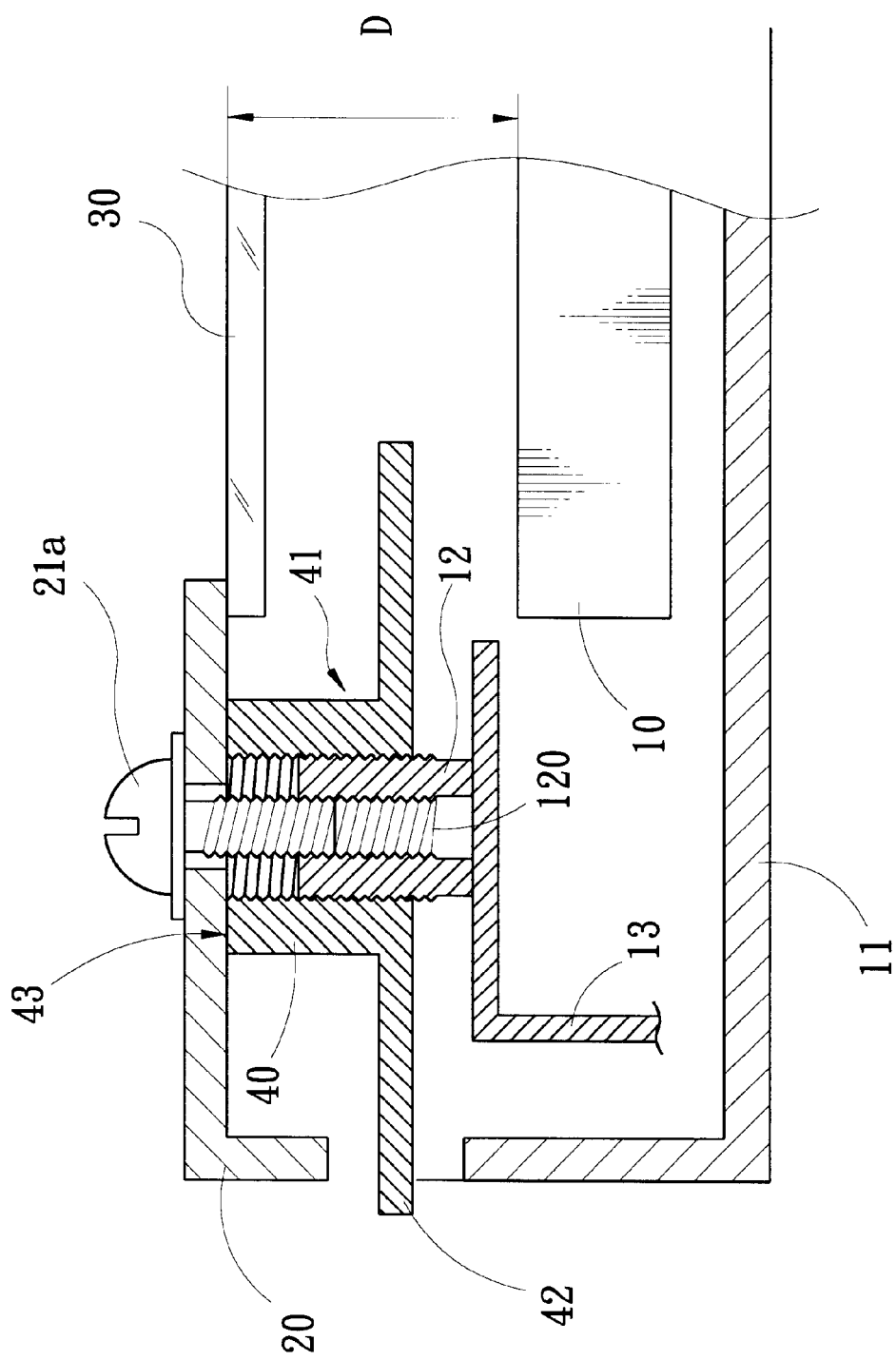
FIG. 2 is a sectional view of an adjusting device for platform of scanner as a first embodiment of the present invention.

As shown in FIG. 2, a flatbed scanner mainly includes a lower case 11 having an opto-mechanic module 10 mounted therein; an upper case 20 mounted on the lower case 11; and a platform 30 mounted on the upper case 20 for carrying the materials (such as documents or photos, not shown) to be scanned. The platform 30 is usually a transparent glass plate supported by a frame of the upper case 20 and fixed therewith by embedding or glue. The platform 30 enables the scanned material to be scanned by the opto-mechanic module 10. In order to ensure good imaging, i.e., obtain a suitable depth of field D, the distance between the surface of platform 30 and the opto-mechanic module 10 must be well calibrated. In other words, the platform 30 must be well positioned in parallel to the opto-mechanic module 10 and keep a suitable distance for clear images detected by the movable opto-mechanic module 10.

An adjusting device for platform of scanner according to the present invention mainly includes an exposed driving element for moving a supporting element of the platform 30. By turning with fingers the driving element from an exposed portion outside the case, the position of the platform 30 can be adjusted.

In a first embodiment of the present invention, as shown in FIG. 2, an adjusting device 40 for platform of a scanner includes an nut 41 incorporated with an exposed flange 42 for turning, and a stud 12 fixed to the lower base 11 via a support 13. The nut 41 rotatively engaged on the stud 12 to move vertically and adjust the height of the platform 30 that is supported on the nut 41 through the upper case 20. The stud 12 is fixed with its bottom end to the support 13. An outer screw is formed outside the stud 12 for engaging with the nut 41. An inner screw 120 is also formed in a inside wall of the stud 12 for engaging with a fastening screw 21a. The flange 42 of the nut 41 exposes outside the case 20 or 20 to be rotated by user. The rotation of the flange 42 and nut 41 will move the upper surface of the nut 41 upwards or downwards and adjust the upper case 11, as well as the platform 30, to a suitable height relative to the opto-mechanic module 10. After the adjustment, the fastening screw 21a engaging into the inner screw 120 of the stud 12 will fasten the upper case 20 and the platform 30 in place.

Figure 3A:
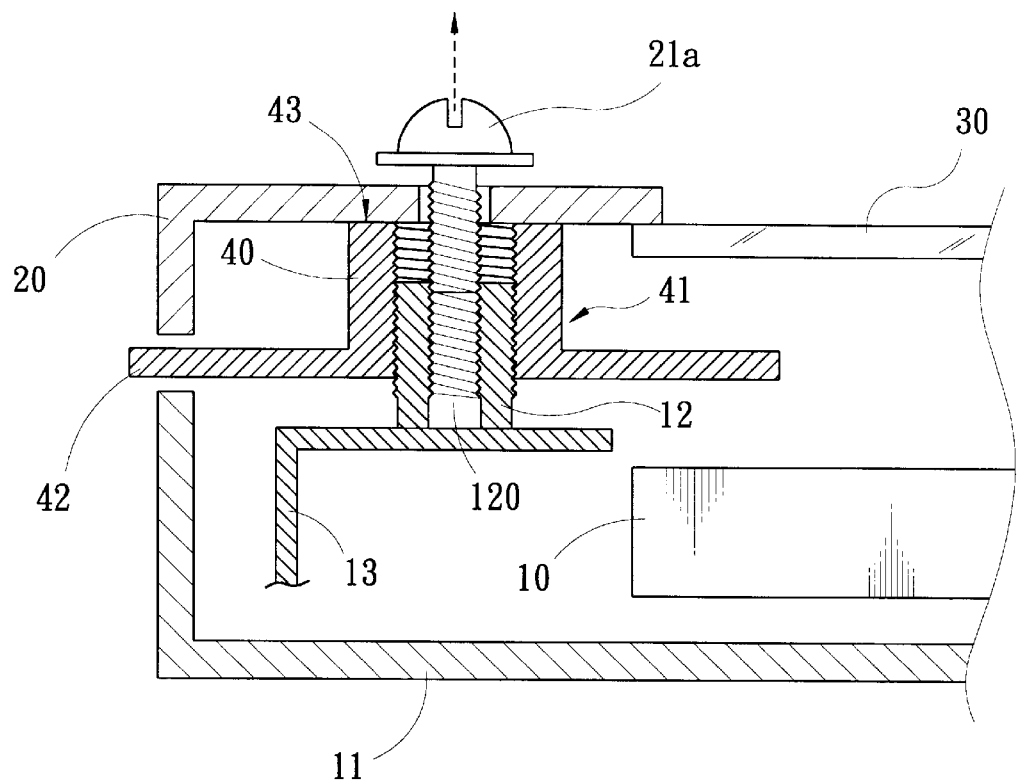
FIGS. 3A, 3B are functional views of the first embodiment of the present invention showing operation of the adjusting device.
Figure 3B:
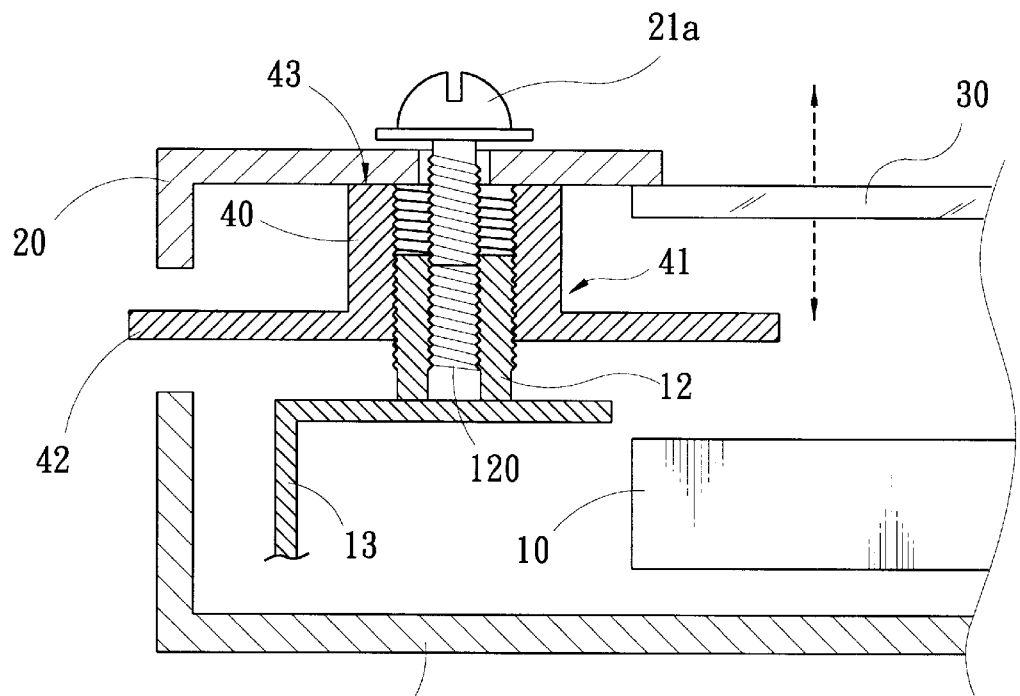

As shown in FIGS. 3A, 3B, when adjusting the device 40, the fastening screw 21a is first released (but need not be removed), especially when the platform 30 is to be adjusted upwards. Then, the flange 42 of nut 41 is rotated by user to move vertically along the axial direction of the stud 12, and adjust the height of the upper case 20 and platform 30. After a suitable position is obtained, the fastening screw 21a can be fastened again to fix the device. The head portion of the fastening screw 21a can further be glued to the upper case 20 to prevent the elements from being moved.

Figure 4:
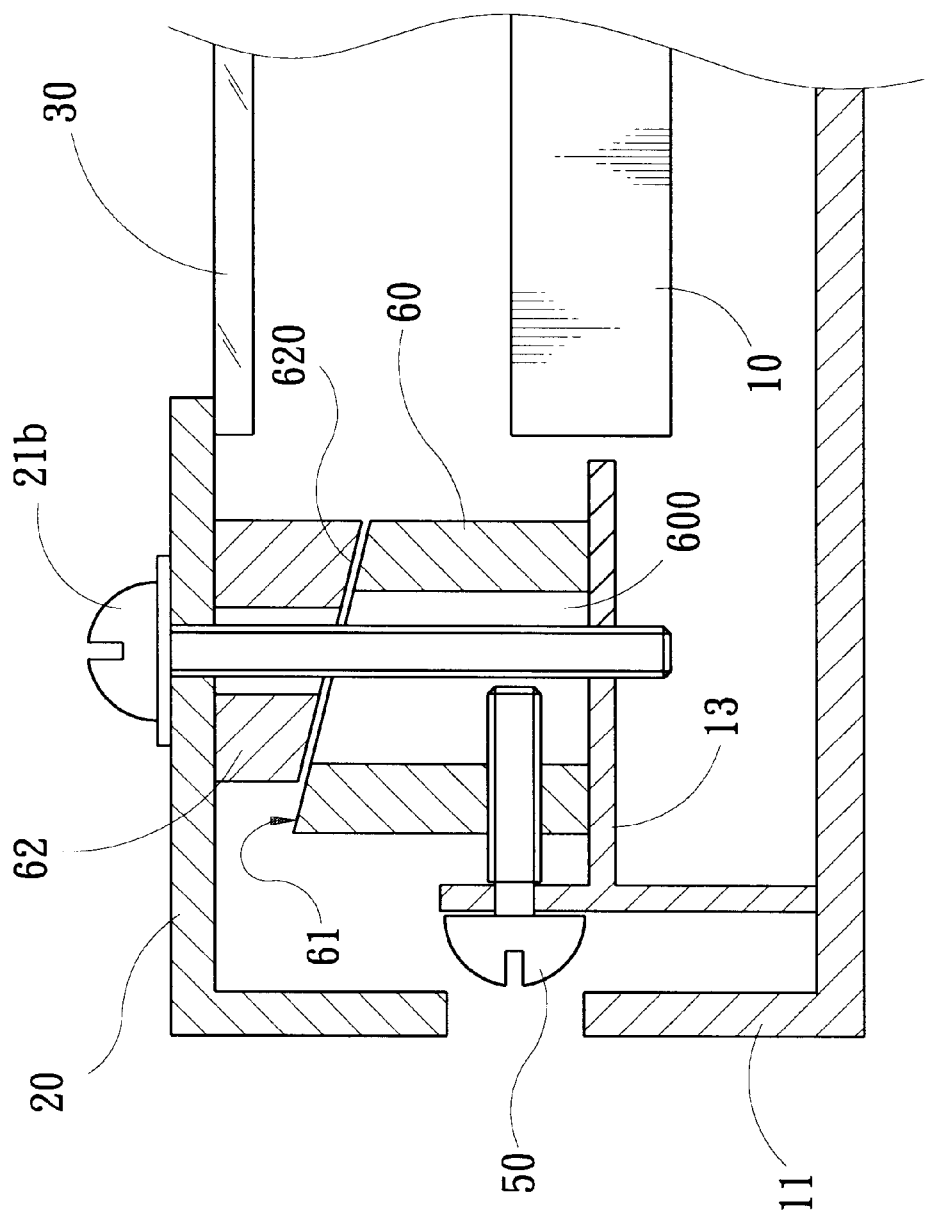
FIG. 4 is a sectional view of an adjusting device for platform of scanner as a second embodiment of the present invention.

FIG. 4 shows a second embodiment of the present invention. The adjusting device for platform of scanner includes a driving slant element 60 movably mounted on the lower case 11 and activated by a screw 50 exposed outwards; and a driven portion 62 formed on the upper case that support the platform 30. By the function of the slant element 60, the upper case 20 and platform 30 will be moved upward or downward to adjust its position according to a horizontal movement of the driving slant element 60. In detail, the screw 50 is rotatively mounted on a support 13 fixed on the lower case 11. The driving slant element 60 seating on the support 13 is movable by the screw 50 engaging on a screw hole formed on side of the driving slant element 60. A first slant 61 is formed on top of the driving slant element 60 to contact the driven portion 62 fixed or formed on the upper case 20. The driven portion 62 is preferably formed with a second slant 620 to match with the first slant 61 of the driving slant element 60. The driving slant element 60 is preferably formed with a through hole 600 having a long slot cross-section to be passed by a fastening screw 21b and guided thereby during moving. After the height of the platform 30 is settled, the fastening screw 21b is fastened to the support 13 to fix the upper case 20 through fixing the driven portion 62 and the driving slant element 60.

Figure 5A:
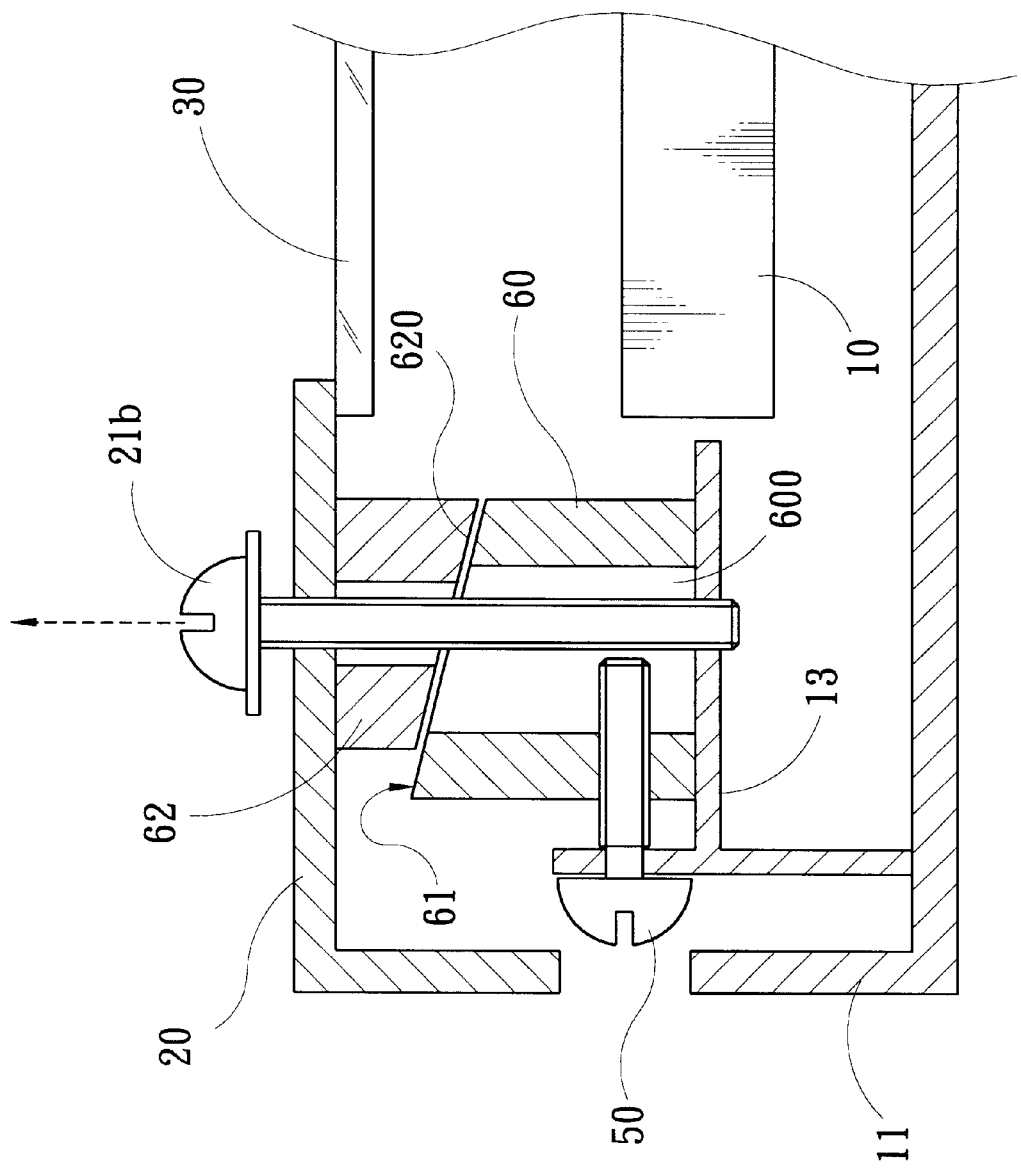
FIGS. 5A, 5B are functional views of the second embodiment of the present invention showing operation of the adjusting device.
Figure 5B:
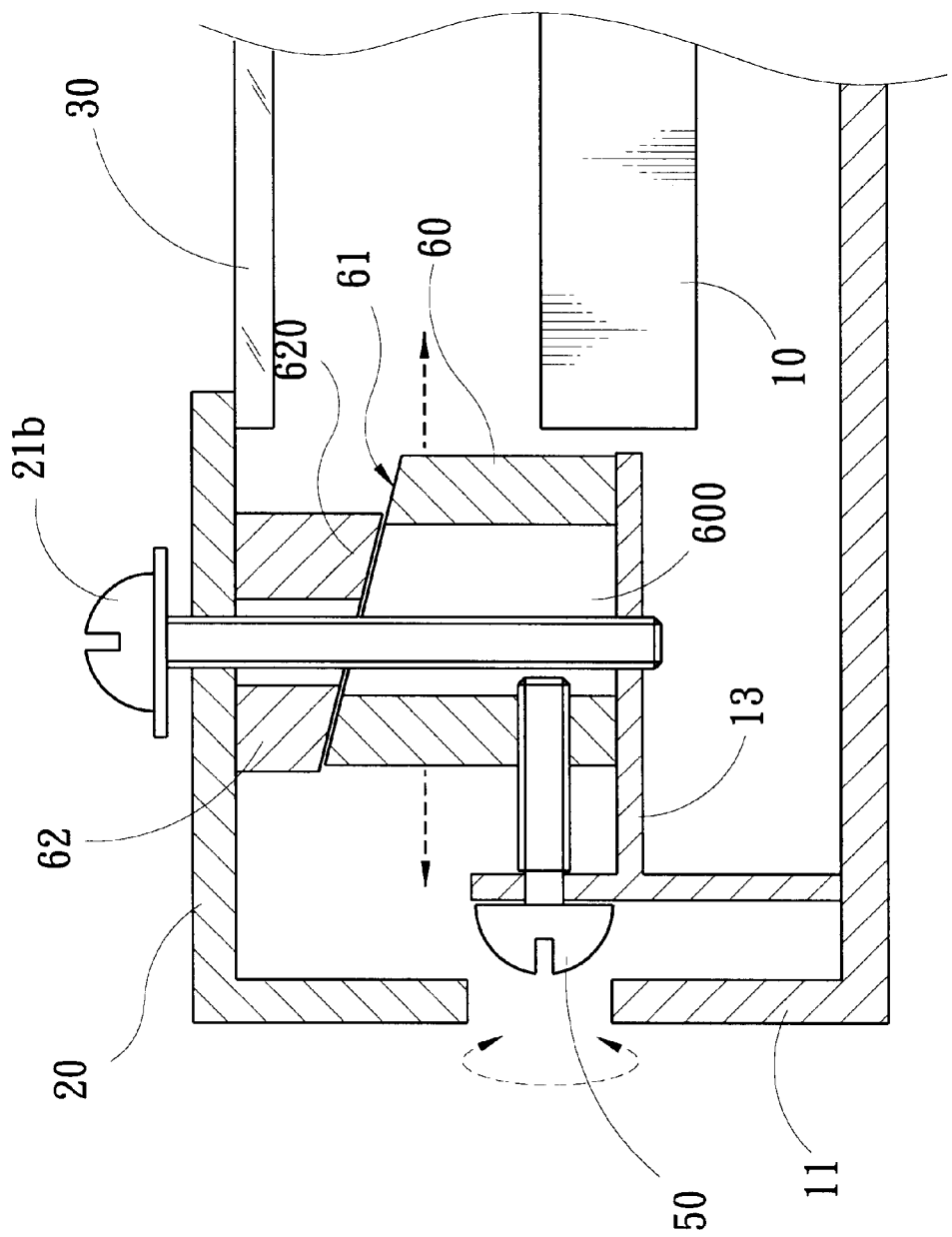

As shown in FIGS. 5A, 5B, when adjusting the device, the fastening screw 21b is first released (but need not be removed), especially when the platform 30 is to be adjusted upwards. Then, the screw 50 is rotated by user to horizontally move the driving slant element 60. The height of the upper case 20 and platform 30 can then be adjusted through the vertical movement of the driven portion 62 caused by movement of the driving slant element 60. After a suitable height is obtained, the fastening screw 21b can be fastened again to fix the device. The head portion of the fastening screw 21b can further be glued to the upper case 20 to prevent the elements from being moved.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A device for adjusting the relative position of a platform of a scanner to an opto-mechanical module of the scanner so as to obtain a suitable depth of field, comprising:

a hollow stud formed with an outer screw and an inner screw, fixed, via a fixed support, in an axially vertical direction to a lower case of the scanner where the opto-mechanical module is fixed;

a nut, rotatively engaged with the outer screw of said stud to move vertically and support and adjust the position of an upper case of the scanner where the platform is fixed when being rotated by a user from a flange formed on the nut; and a fastening screw, engaged into the inner screw of said stud, for fastening said upper case and said platform in place.

2. The device for adjusting the position of a platform of a scanner according to claim 1, wherein said nut comprises a nut portion and the flange incorporated as a unit; said nut portion engages with said hollow stud and is formed with an upper surface for supporting said upper case and said platform; said flange has a diameter larger than that of said nut portion and is exposed outside said upper case to be operated and turned by a user.

3. A device for adjusting the relative position of a platform of a scanner to an opti-mechanical module of the scanner so as to obtain a suitable depth of field, comprising:

a driving screw rotatively mounted on and exposed outwards a lower case of the scanner where the opto-mechanical module is fixed;

a driven portion formed on an upper case of the scanner that fixes the platform;

a driving slant element movably mounted on said lower case and activated by said driving screw to move horizontally; a first slant is formed on top of said driving slant element to contact said driven portion and causes upward and downward movement of said upper case and said platform by movement of said driving slant element; and a fastening screw to fix said upper case to said lower case through fixing said driven portion and said driving slant element.

4. The device for adjusting the position of a platform of a scanner according to claim 3, wherein said driving screw is rotatively mounted on a support fixed on said lower case; and said driving slant element is movable on a surface of said support.

5. The device for adjusting the position of a platform of a scanner according to claim 4, wherein said driving slant element is preferably formed with a through hole having a long slot cross-section to be passed by fastening screw and guided thereby during moving.

6. The device for adjusting the position of a platform of a scanner according to claim 3, wherein said driven portion is formed with a second slant to correspond to said first slant of the driving slant element.

* * * * *